(12) United States Patent
Wiest et al.

(10) Patent No.: US 10,634,531 B2
(45) Date of Patent: Apr. 28, 2020

(54) ULTRASONIC, FLOW MEASURING DEVICE

(71) Applicant: Endress + Hauser Flowtec AG, Reinach (CH)

(72) Inventors: Achim Wiest, Weil am Rhein (DE); Beat Kissling, Reinach (CH); Quirin Muller, Battwil (CH); Sascha Grunwald, Steinen (DE)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 172 days.

(21) Appl. No.: 15/528,903

(22) PCT Filed: Nov. 3, 2015

(86) PCT No.: PCT/EP2015/075527
§ 371 (c)(1),
(2) Date: May 23, 2017

(87) PCT Pub. No.: WO2016/091477
PCT Pub. Date: Jun. 16, 2016

(65) Prior Publication Data
US 2017/0314977 A1 Nov. 2, 2017

(30) Foreign Application Priority Data
Dec. 9, 2014 (DE) .......................... 10 2014 118 187

(51) Int. Cl.
*G01F 1/66* (2006.01)
(52) U.S. Cl.
CPC .............. *G01F 1/662* (2013.01); *G01F 1/667* (2013.01)
(58) Field of Classification Search
CPC ..................................................... G01F 1/662
(Continued)

(56) References Cited

U.S. PATENT DOCUMENTS 4,103,551 A 8/1978 Lynnworth
4,610,167 A 9/1986 McShane
(Continued)

FOREIGN PATENT DOCUMENTS

CN 1172528 A 2/1998
CN 1478194 A 2/2004
(Continued)

OTHER PUBLICATIONS

German Search Report, German Patent Office, Munich, DE, dated Aug. 26, 2015.
(Continued)

*Primary Examiner* — Walter L Lindsay, Jr.
*Assistant Examiner* — Philipmarcus T Fadul
(74) *Attorney, Agent, or Firm* — Bacon & Thomas, PLLC

(57) ABSTRACT

A measuring tube, especially a measuring tube for an ultrasonic, flow measuring device, which measuring tube has a measuring tube wall and at least in certain regions a basic form with rotational symmetry or polygonal cross section and a straight measuring tube axis. The measuring tube includes at least one functional area for positioning a reflector, on which an acoustic signal is reflected on a signal path, and the functional area is formed integrally from the measuring tube wall. The functional area defines in at least one sectional view a circular segment, which serves as support for a reflector or the functional areas has stops, whose distal ends define in at least one sectional view a circular segment, which serves as support for a reflector, as well as an ultrasonic, flow measuring device and a method for manufacture of a measuring tube.

11 Claims, 4 Drawing Sheets

(58) Field of Classification Search
USPC .................................................. 73/861.25
See application file for complete search history.

(56) References Cited

U.S. PATENT DOCUMENTS

| | | | |
|---|---|---|---|
| 5,090,252 A | 2/1992 | Tschirner | |
| 7,287,436 B2 | 10/2007 | Lang | |
| 9,097,567 B2 | 8/2015 | Wiest | |
| 9,140,594 B2 | 9/2015 | Wiest | |
| 2002/0124661 A1 | 9/2002 | Wagner | |
| 2004/0129088 A1* | 7/2004 | Moscaritolo | G01F 1/662 73/861.25 |
| 2008/0028868 A1 | 2/2008 | Konzelmann | |
| 2011/0222665 A1* | 9/2011 | Morton | H01J 35/12 378/141 |
| 2014/0083202 A1* | 3/2014 | Wiest | G01F 1/662 73/861.27 |
| 2015/0000422 A1* | 1/2015 | Wiest | G01F 1/662 73/861.25 |
| 2017/0314977 A1 | 11/2017 | Wiest | |

FOREIGN PATENT DOCUMENTS

| | | |
|---|---|---|
| CN | 101076709 A | 11/2007 |
| CN | 102288328 A | 12/2011 |
| DE | 8904673 U1 | 7/1989 |
| DE | 19808701 A1 | 9/1999 |
| DE | 102004060063 A1 | 6/2006 |
| DE | 102008055030 A1 | 7/2010 |
| DE | 102011076000 A1 | 11/2012 |
| DE | 102011079250 A1 | 1/2013 |
| DE | 102013105407 A1 | 11/2014 |
| DE | 102014118187 A1 | 6/2016 |
| EP | 0392294 A1 | 10/1990 |
| JP | 2004219290 A | 8/2004 |
| WO | 0244662 A1 | 6/2002 |
| WO | 2005031369 A2 | 4/2005 |
| WO | 2010069869 A1 | 6/2010 |

OTHER PUBLICATIONS

International Search Report, EPO, The Netherlands, dated Feb. 12, 2016.
English Translation of the International Preliminary Report on Patentability, WIPO, Geneva, CH, dated Jun. 22, 2017.
Chinese Office Action in corresponding Chinese Application No. 201580067482.5, dated Dec. 21, 2018.
Office Action dated Sep. 6, 2019 in corresponding Chinese Application No. 201580067482.5.

* cited by examiner

ULTRASONIC, FLOW MEASURING DEVICE

TECHNICAL FIELD

The present invention relates to an ultrasonic, flow measuring device.

BACKGROUND DISCUSSION

Ultrasonic, flow measuring devices are widely applied in process and automation technology. They enable convenient determination of volume flow and/or mass flow in a pipeline.

Known ultrasonic, flow measuring devices work frequently according to the travel-time difference principle. In the case of the travel-time difference principle, the different travel times of ultrasonic waves, especially ultrasonic pulses, so-called bursts, are evaluated relative to the flow direction of the liquid. For this, ultrasonic pulses are sent, i.e. transmitted, at a certain angle to the tube axis both in the direction of the flow as well as also counter to the flow. From the travel-time difference, the flow velocity, and therewith, in the case of known diameter of the pipeline section, the volume flow, can be determined.

The ultrasonic waves are produced and received with the assistance of so-called ultrasonic transducers. For this, ultrasonic transducers are fixed in the tube wall of the relevant pipeline section. Also clamp-on ultrasonic, flow measuring systems are obtainable. In the case of clamp-on systems, the ultrasonic transducers are pressed externally of the measuring tube on its tube wall. A great advantage of clamp-on ultrasonic, flow measuring systems is that they do not contact the measured medium and are placed on an already existing pipeline.

The ultrasonic transducers are normally composed of an electromechanical transducer element, e.g. a piezoelectric element, and a coupling layer. In the electromechanical transducer element, the ultrasonic waves are produced as acoustic signals and led via the coupling layer to the tube wall and from there into the liquid in the case of clamp-on systems. In the case of inline systems, the ultrasonic waves pass via the coupling layer directly into the measured medium. In such case, the coupling layer is also (not so frequently) referred to as a membrane.

Between the piezoelectric element and the coupling layer, another coupling layer can be arranged, a so called adapting, or matching, layer. The adapting, or matching, layer performs, in such case, the function of transmitting the ultrasonic signal and simultaneously reducing a reflection caused by different acoustic impedances at boundaries between two materials.

Both in the case of clamp-on systems as well as also in the case of inline systems, the ultrasonic transducers are arranged on the measuring tube in a shared plane, either on oppositely lying sides of the measuring tube, in which case the acoustic signal moves, projected on a tube cross section, once along a secant through the measuring tube, or on the same side of the measuring tube, in which case the acoustic signal is reflected on the oppositely lying side of the measuring tube, whereby the acoustic signal traverses the measuring tube twice along secants projected on the cross section through the measuring tube. U.S. Pat. Nos. 4,103,551 and 4,610,167 show ultrasonic, flow measuring devices with reflections on reflection surfaces provided in the measuring tube. Also multipath systems are known, which have a number of ultrasonic transducer pairs, which, in each case, form a signal path, along which the acoustic signals extend through the measuring tube. The respective signal paths and the associated ultrasonic transducers lie, in such case, in planes mutually parallel and parallel to the measuring tube axis. U.S. Pat. Nos. 4,024,760 and 7,706,986 show, by way of example, such multipath systems. An advantage of multipath systems is that they can measure the profile of the flow of the measured medium in the measuring tube at a number of locations and thereby provide highly accurate measured values for the flow. This is achieved based on, among other things, also the fact that the individual travel times along the different signal paths are differently weighted. Disadvantageous in the case of multipath systems is, however, their manufacturing costs, since a greater number of ultrasonic transducers and, in given cases, a complex evaluating electronics are applied.

There are different approaches for weighting the signal paths. The paper "Comparison of integration methods for multipath acoustic discharge measurements" by T. Tresch, T. Staubli and P. Gruber in the Proceedings of the 6th International Conference on Innovation in Hydraulic Efficiency Measurements, 30 Jul.-1 Aug. 2006 in Portland, Oreg., USA, compares established methods for weighting the travel times along different signal paths for calculating flow.

European patent, EP 0 715 155 A1 proposes a measuring arrangement utilizing multiple refraction, wherein the subsections of the signal path form only one plane, which extends parallel to the measuring tube axis. The reflection surfaces on which a first subsection of the signal path ends and a second subsection of the signal path begins are shown in EP 0 715 155 A1 as planar bodies, which are placed on the inner side of the tube. It is, indeed, theoretically possible, to introduce reflection surfaces from the ends of a measuring tube and then to weld them to the inner wall of the measuring tube. However, such a manufacture in the case of smaller measuring tubes with small nominal diameters rapidly approaches its limits, since a welding device can in the case of small nominal diameters only be applied with great effort and is accompanied by loss of precision as regards the positioning of the reflection unit. Thus, the teaching of EP 0 715 155 A1 is for measuring tubes with large nominal diameters.

German patent, DE 10 2008 055 030 A1 describes a connection nozzle formed by hydroforming in an ultrasonic flow measurement device. An ultrasonic transducer is inserted into the connection nozzle. Signal transmission occurs along a straight signal path without reflection on the tube wall. The measuring tube of the flow measuring device has, in such case, a flat shape, so that—in other than in the case of round cross sections—in the case of this measuring tube, less disturbances in the flow profile from vortices can occur.

German patent, DE 102 49 542 A1 describes a coupling surface for in-coupling of an ultrasonic signal from an ultrasonic transducer into a measuring tube, wherein the coupling surface is formed inclined to the measuring tube. The measuring tube includes additionally a formed body 10, which provides a reflection surface.

European patent, EP 0 303 255 A1 describes a measuring tube of an ultrasonic flow measuring device, in which a reflection surface is embodied integrally with the measuring tube. In such case, a cross-sectional widening of the measuring tube occurs over a broad region, and this is unfavorable for accuracy of the measurement data.

German patent, DE 10 2012 013 916 A1 shows, in contrast, a measuring tube of an ultrasonic flow measuring device with screwed-in reflection surfaces. In such case, first of all, a connection nozzle with a screw thread is formed, into which a reflector can then be inserted. This manufacturing variant has basically been successful for all measuring tubes, independently of their nominal diameter. This manufacture requires, however, the exact maintaining of predetermined bore patterns and each connection nozzle must be separately processed before the insertion of the reflector.

An alternative, already known variant is the casting of the tube and the welding of nozzles onto the measuring tube and the following screwing in or welding on of a reflection surface.

Known from German patent, DE 10 2013 105 922 A1 is an ultrasonic, flow measuring device with a measuring tube produced by means of a high pressure forming method. The geometric accuracy and the orientation of the area normals at the desired angle is, however, less in the case of formed reflection surfaces compared with screwed reflectors.

SUMMARY OF THE INVENTION

An object of the invention is to provide an ultrasonic, flow measuring device with a number of reflection surfaces in the measuring tube, wherein the measuring tube can be manufactured with reduced manufacturing time, yet highly accurately directed reflection surfaces can be established for setting an optimal signal path.

The object is achieved by a measuring tube and by an ultrasonic, flow measuring device.

A measuring tube of the invention, especially a measuring tube for an ultrasonic, flow measuring device, has a measuring tube wall and at least in certain regions, a basic form with rotational symmetry or a polygonal cross section. It has, furthermore, a straight measuring tube axis (M).

The measuring tube includes, according to the invention, at least one functional area for positioning a reflector, on which an acoustic signal on a signal path is reflected. Of course, in the case of a so-called two traverse system, just one functional area can be sufficient for positioning a single reflector. This enables the fine setting and fine orientation of the reflector and its associated reflection surface. In the case of a measuring tube, which is designed analogously to DE 10 2013 105 922 A1 for multireflection, of course, a number of functional areas and reflectors are necessary.

The aforementioned functional area is formed integrally from the measuring tube wall. It is not cast. The measuring tube wall is preferably made of a metal. As is known, metal is ductile and can be deformed. Likewise, as is known, those skilled in the art recognize a deformation process compared with a casting based on the directionality of the metal micro/macro structure in a polished specimen. Any subsequently welded on or adhered functional areas are also not the same as functional areas coming from a deformation process, as those skilled in the art can likewise immediately detect from observation of a polished specimen.

The aforementioned functional area defines in a first embodiment of the invention a circular segment in at least one sectional view. This circular segment serves as support for a reflector. The circular segment is, consequently, formed by the surface of the functional area.

The functional area includes, in a second embodiment of the invention, stops, whose distal ends define a circular segment in at least one sectional view. The stops, thus, protrude from the functional area. In this case, the stop areas do not form a closed area, but, instead, the end faces of the individual stops lie all in a circular segment. The circular segment serves as support for a reflector.

It is advantageous, when the measuring tube has in the region of the functional area a closed measuring tube wall. In the case of flow measurement, avoidance of bores is an important aspect. Each individual bore must be checked for sealing when the medium is under pressure. Additionally, various media can attack the sealing material. Therefore, the measuring tube should have only a minimum number of bores.

It is further advantageous, when the measuring tube has a number of functional areas for positioning respective reflectors, wherein the ultrasonic signal is reflected on the signal path multiple times. This relates especially to multireflection within a signal route, analogously to DE 10 2013 105 922 A1, which publication is referenced herewith in this regard. It can, in such case, be such that only one functional area has a circular segment and all other functional areas are embodied e.g. just as in DE 10 2013 105 922 A1. In this case, the fine orientation occurs by means of only one reflector.

It is, however, especially advantageous, when each of the functional areas define in at least one sectional view a circular segment, which serves as support for a reflector or that each of the functional areas has stops, whose distal ends define in at least one sectional view a circular segment, which serves as support for a reflector.

The functional area or areas can advantageously be oriented in such a manner that a measuring tube section protrudes with a functional area outwardly at least from the basic form of the measuring tube.

It is advantageous, when the measuring tube in the transitional region between the basic form of the measuring tube wall and the functional area has a metal grain structure, which has an orientation in the direction of the contour of the measuring tube. Such is a unique indication of a forming process, with which also measuring tubes of smaller sheet thickness are manufacturable. This concerns especially measuring tubes having a measuring tube wall of sheet metal, preferably with a sheet metal thickness from 1-5 mm.

It is especially advantageous when the at least one functional area is formed from the measuring tube by an internal high-pressure forming method.

It is especially advantageous, when the functional area in all section views perpendicular to the measuring tube axis define a circular segment, which serves as support for a reflector. The means the reflector is not only finely adjustable as regards one degree of freedom of movement, but, instead, such as in the case of a ball joint, is orientable in many degrees of freedom.

Analogously, this advantage holds also for the second embodiment with stops, which protrude from the functional area.

An ultrasonic, flow measuring device of the invention includes
 a measuring tube of the invention
 a sender for sending an acoustic signal on a signal path and
 a receiver for receiving the acoustic signal on the signal path.

The measuring tube of the invention includes at least one reflector having at least one reflection surface.

In a first embodiment of the invention, the reflector includes a connection surface, which defines a circular segment in at least one sectional view. In an alternative, second embodiment of the invention, the reflector includes a connection surface, from which stops protrude, which define a circular segment in at least one sectional view.

The circular segment is embodied complementarily to the circular segment of the functional area of the measuring tube. That means it has approximately the same number of radians. The reflector is arranged on the functional area of the measuring tube.

By the interaction of the reflectors with the functional areas, a fine setting of the reflection surfaces for orientation for an ideal signal path is assured.

Advantageous embodiments of an ultrasonic, flow measuring device are subject matter of the dependent claims It is advantageous when the measuring tube has a number of reflectors, wherein the acoustic signal is reflected on a signal path multiple times, especially wherein the acoustic signal is reflected at least once on the reflection surface of each reflector.

For registering an as comprehensive as possible flow profile, it is advantageous, when the signal path is composed of straight subsections, wherein
  a) the minimum distances of at least three subsections have a separation of 0.4-0.6 r from the measuring tube axis, wherein r is the inner radius of the measuring tube;
  b) a first subsection, which defines a first axially parallel plane, has a directly corresponding second subsection, which defines a second axially parallel plane, the two planes extend through a reflection surface of a first reflector and the normal vectors enclose an angle of less than 10°,
  c) a third subsection, which defines a third axially parallel plane, has a directly corresponding fourth subsection, which defines a fourth axially parallel plane, the two planes extend through a second reflector having a reflection surface and the normal vectors enclose an angle of less than 10°.

It is additionally advantageous, when the ultrasonic, flow measuring device takes into consideration a rotation balancing of rotating flows.

A method of the invention for manufacturing a measuring tube of an ultrasonic, flow measuring device, includes the steps as follows:
  a. deforming a measuring tube by a forming method, especially by a high-pressure forming method, with introduction of a number of functional areas, wherein each functional area describes and defines a circular segment in at least one sectional view as a defined position for a reflector;
  b. positioning reflectors on the functional areas, wherein a reflector has an area complementary to the functional area, wherein the positioning occurs preferably in such a manner that a form fitting is achieved between measuring tube wall and reflector,
  c. orienting the reflectors in order to set a predefined ultrasonic signal path, and
  d. securing the reflectors to the measuring tube wall.

Such a method is simple and safe for manufacturing and with exact adjusting of the signal path can improve the manufacturing time and the quality of the measuring device.

Especially advantageously, the securing of the reflectors can occur by introduction of a foil-like intermediate layer between a functional area of a measuring tube and a connection surface of a reflector and by reactive bonding.

Other advantageous embodiments of an ultrasonic, flow measuring device of the invention will now be described.

The measuring tube of the invention can be divided into individual measuring tube sections or portions, which are connected with one another by welding or connected with one another integrally seamlessly, thus without welded seams. The latter is preferable, since seamless transitions of the measuring tube sections or portions are manufacturable especially cost effectively and with time savings. Moreover, an additional manufacturing step and a supplemental component can be eliminated. The basic form can be embodied only sectionally, especially via only one measuring tube section, for a first portion of the measuring tube, or extend over the total course of the measuring tube. Known basic forms with rotational symmetry or polygonal cross section in the field of tube construction are, for example, cylindrical forms or often pipelines with square shaped lateral area applied in gaslines. Of course, other rather unusual tube geometries, such as e.g. tubes with prism shaped side areas are also included in the subject matter of the invention.

The ultrasonic, flow measuring device includes, moreover, a sender for sending an acoustic signal on a signal path and a receiver for receiving the acoustic signal on the signal path. The terms sender and receiver are to be understood in the context of present invention in such a manner that the sender and the receiver can be satisfied by one and the same ultrasonic transducer. The corresponding ultrasonic transducer includes, in this case, an operating mode for sending operation and functions in this operating mode as sender. It includes additionally an operating mode for receiving operation and functions in this operating mode as receiver. After sending an ultrasonic signal, the ultrasonic transducer can switch from the sending mode into the receiving mode, while the ultrasonic signal travels a signal path in the measuring tube. The ultrasonic signal can in its travel be directed perpendicularly onto a reflection surface and thus be turned back onto the already traveled signal path until it reaches the originating ultrasonic transducer. When the ultrasonic signal reaches the ultrasonic transducer, such is located in the receiving mode and represents a receiver. Insofar, the transmitter and the receiver are implemented by two circuit arrangements (a circuit for sending mode and a circuit for receiving mode) in one and the same ultrasonic transducer. Essentially more frequent and preferentially covered by the subject matter of the invention, however, is an arrangement of at least two ultrasonic transducers as sender and receiver, each of which is switchable between the sending- and receiving modes of operation. The measuring for ascertaining the flow velocity or the volume flow is performed by means of the per se known, travel-time difference method.

The measuring is done preferably using multireflection of the ultrasonic signal in the measuring tube. Preferably in such case, the ultrasonic signal propagates in the axial direction through the measuring tube without, however, having a course parallel to the measuring tube axis. The multireflection has, in such case, especially the goal of compensating measurement disturbances, which are brought about by the rotation of the flow.

For implementing the multireflection, the measuring tube includes a number of reflectors, on which the acoustic signal is reflected multiple times on the signal path, preferably at least once on each reflection surface. A large number of measuring devices are known, which implement a single reflection on the measuring tube wall. This is called a two traverse arrangement.

The present invention can also be applied to two traverse arrangements. However, the invention is directed especially preferably to multireflection arrangements, in the case of which the ultrasonic signal is reflected multiple times one after the other in the measuring tube on signal path portions.

The functional areas for accommodating the reflectors are, in such case, integrally formed from the measuring tube wall. Integrally formed means in this connection that the functional areas are not provided as a separate component welded on or in the measuring tube but, instead, by the measuring tube wall. The measuring tube wall is, in such case, deformed in the regions of the functional areas and deviates in these regions from its basic form.

Integrally formed reflection surfaces are known from German patent, DE 198 61 073 A1 or also from U.S. Pat. No. 5,090,252 A. These reflection surfaces lead, however, to a narrowing or widening of the measuring tube cross section and change therewith the flow profile in considerable measure.

As a result of this essentially more variable orientation of the reflectors, more complicated signal path courses are implementable and the signal path can be set highly precisely.

The functional areas can be pre-oriented and be oriented in such a manner that a plurality of the functional areas protrude outwardly at least from the basic form of the measuring tube. As a result of this arrangement, optimized signal path courses can be very easily implemented.

The functional areas are formed in the measuring tube wall in such a manner that multireflection occurs in the measuring tube, wherein the signal path is reflected on at least three reflection surfaces of reflectors arranged one after the other in the axial direction. As a result of reflectors arranged one after the other, a change of the flow profile, which develops over the measuring range defined by the signal path, can at least partially be registered and compensated.

In the case of fast flows, the ultrasonic signal can deviate from the ideal point of impingement on the respective reflection surface. This deviation continues on the reflection surface following thereon and can in the worst case with multiple reflections lead to signal loss. This error is defined in the context of present invention as dispersion. In order to prevent dispersion, it is advantageous, when the reflection surface or the reflection surfaces of the reflectors are embodied with a preferably convex reflection surface curvature. While the tube wall of a cylindrical tube is also convexly embodied, the contour of the reflection surface curvature in the case of the present reflection surface differs from a curvature of the measuring tube wall. This difference can especially result in different circular arc length in the case of constant central angle or in a central angle, which has a vertex, which lies not on the measuring tube axis.

The at least one functional area is advantageously formed from the measuring tube by an internal high-pressure forming method. The internal high-pressure forming method is also known as hydroforming. In such case, an outer contour is deformed by an internal pressure. Soft, rounded transitions between the measuring tube elements are an essential feature of this technology. Since the tube interior of the measuring tube has, as a result, no flow impeding, sharp edges, this technology is especially preferable. Additionally, the production time of a measuring tube in the case of this forming technology is especially small.

The connection nozzle can be formed from the planar functional area by means of a flowdrilling process. In this way, the connection nozzle is formed integrally from the measuring tube wall by material extrusion. A specialized component for the connection nozzles does not, consequently, have to be produced and welded in a special manufacturing step, which means working time and cost are reduced. Especially preferably, a screw thread can be formed in these connection nozzles.

It is advantageous, when the measuring tube has one or more other measuring tube sections, or portions, of the measuring tube, which have a greater measuring tube cross section than the first portion of the measuring tube, wherein the widening of these measuring tube sections occurs by an internal high-pressure forming of the measuring tube. The first portion with lesser measuring tube cross section provides an increasing of the achieved measurement effect. This occurs by an increasing of the flow velocity and thereby a greater $\Delta t$ in the case of measurement according to the travel-time difference method.

The functional areas are especially formed in the measuring tube in such a manner and the reflectors oriented in such a manner that a deflection of the signal path occurs in such a manner that at least three path portions of the signal path following one after the other have, in each case, no intersection with the measuring tube axis. As a result of this arrangement, the flow profile is registered on different planes. Symmetric and asymmetric vortices in the flow profile can be better averaged out.

The course of the signal path can describe in axial plan view a polygon, whose lateral points of intersection lie within, on or outside of the measuring tube. As a result of this course of the signal path, the measuring device is especially enabled in the measuring to take into consideration and to compensate a rotation balancing of rotating flows.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
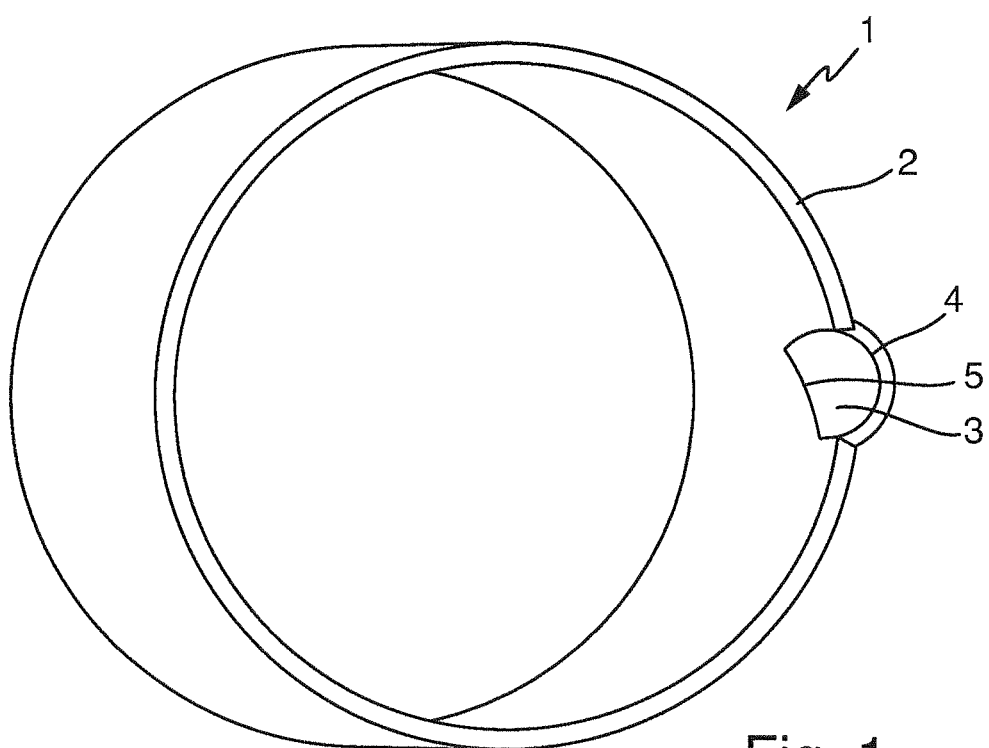
FIG. 1 is an axial plan view of an ultrasonic, flow measuring device of the invention.

Ultrasonic, flow measuring devices, such as the ultrasonic, flow measuring device of the invention, are widely applied in process and automation technology. They enable easy determination of volume flow and/or mass flow in a pipeline. Known ultrasonic, flow measuring devices work frequently according to the travel-time difference principle. In the case of the travel-time difference principle, the different travel times of ultrasonic waves, especially ultrasonic pulses, so-called bursts, are evaluated relative to the flow direction of the liquid. For this, ultrasonic pulses are sent at a certain angle to the tube axis both with the flow as well as also counter to the flow. From the travel-time difference, the flow velocity and therewith in the case of known diameter of the pipeline section the volume flow can be determined.

The ultrasonic waves are produced and received with the assistance of so-called ultrasonic transducers. For this, ultrasonic transducers are fixed in the tube wall of the relevant pipeline section. Also clamp-on ultrasonic, flow measuring systems can be obtained. In the case of these systems, the ultrasonic transducers are pressed externally of the measuring tube on its tube wall. In the present case of concern, however, is preferably a so-called inline, flow measuring device, in the case of which the ultrasonic transducers are integrated fixedly in the measuring tube and the ultrasonic signal enters directly through a so-called ultrasound window from the ultrasonic transducer into the medium.

In the flow measuring device of the invention, usually ultrasonic transducers are applied. These ultrasonic transducers are, normally, composed of an electromechanical transducer element, e.g. a piezoelectric element, and a coupling layer. Arranged between the piezoelectric element and the coupling layer can be another layer, a so called adapting, or matching, layer. The adapting, or matching, layer performs, in such case, the function of transmission of the ultrasonic signal and simultaneously the reduction of a reflection caused by different acoustic impedances at the interface between two materials. Other so-called coupling-and/or matching layers, as a well as a metal disk and/or layers for better temperature conduction can be provided.

Both in the case of most clamp-on systems known from the state of the art, as well as also in the case of most inline systems known from the state of the art, the ultrasonic transducers are arranged on the measuring tube in a shared plane, either on oppositely lying sides of the measuring tube, in which case the acoustic signal, projected on a tube cross section, extends once along a secant through the measuring tube, or on the same side of the measuring tube, in which case the acoustic signal is reflected on the oppositely lying side of the measuring tube, whereby the acoustic signal traverses the measuring tube twice along the secant projected on the cross section through the measuring tube.

In the present ultrasonic, flow measuring device, a multireflection of the ultrasonic signal occurs on reflection surfaces within the measuring tube. As a result of splitting up into a number of signal paths, the flow profile of the ultrasonic, flow measuring device can be registered better. Additionally, flow rotations and flow turbulence can be cancelled by an especially favorable guiding of the signal path on a number of signal path portions within the measuring tube.

Figure 2:
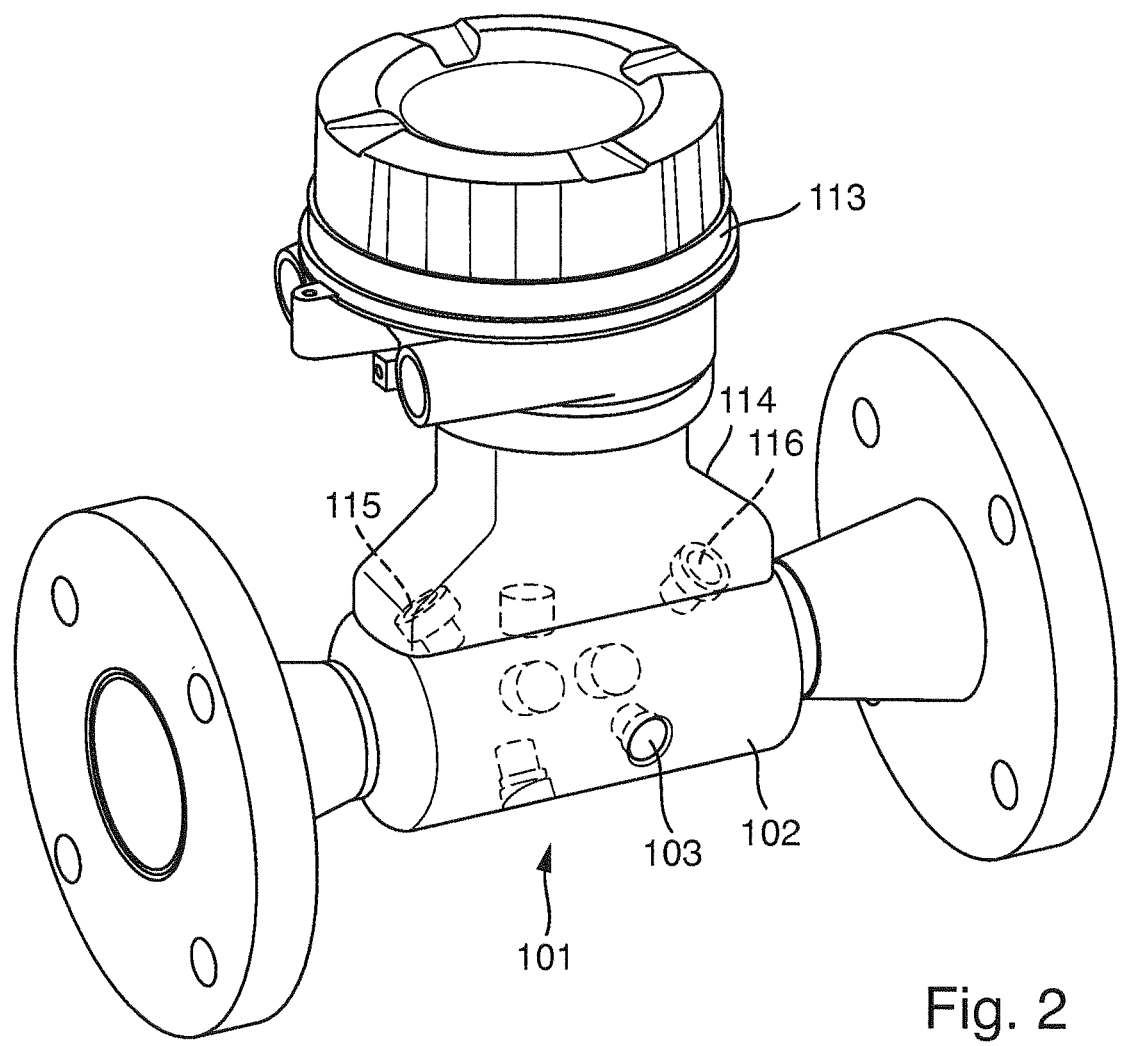
FIG. 2 is a partially transparent, perspective view an ultrasonic, flow measuring device of the state of the art.

FIG. 2 shows construction of an ultrasonic, flow measuring device 101, such as known from DE 10 2012 013 916 A1 and DE 10 2013 105 922 A1, to which comprehensive reference is taken in the context of present invention. As indicated in FIG. 2, reflectors 103 are secured in a measuring tube 102 of the ultrasonic, flow measuring device 101. This occurs by screwing the reflectors 103 into seats provided therefor. The screwed-in reflectors 103 are shown in detail in FIG. 3.

In the transparent view of FIG. 2, additionally, two ultrasonic transducers are shown, which are embodied as a sender 115 and a receiver 116. The evaluation of the measurement signals and the forwarding occurs in a transmitter 113, which in the present example is secured to the measuring tube via a connection piece 114.

This arrangement of sender, receiver, transmitter 113 and connection piece 114 and the course of the signal path are constructively equally applicable to FIG. 1, which will now be discussed.

Figure 3:
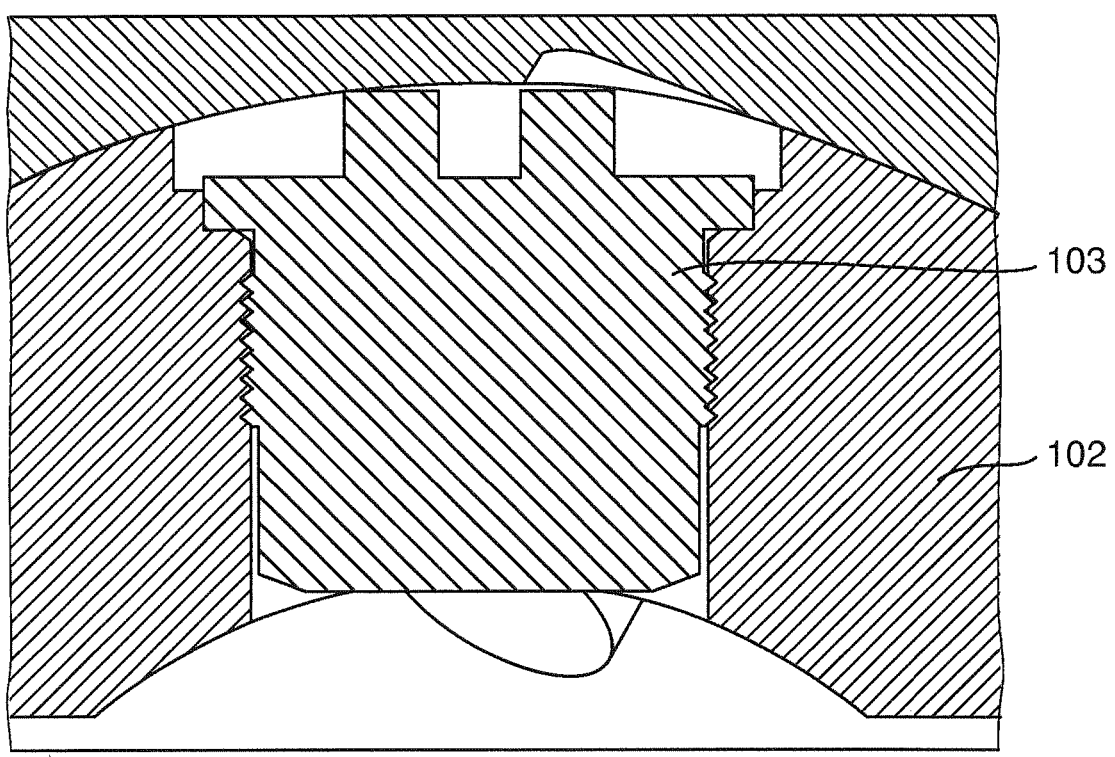
FIG. 3 is a view of the positioning of a reflector in the wall of the measuring tube of the ultrasonic, flow measuring device FIG. 2.

The embodiment shown simplified in FIG. 1 is an embodiment according to the invention modified relative to FIGS. 2 and 3. Only a simplified section of a measuring tube 1 is shown. Measuring tube 1 includes a measuring tube wall 2. FIG. 1 shows that the measuring tube wall 2 has an integrally formed area, which deviates from the basic form of the measuring tube wall, here in the form a cylinder. This area is referred to herein as functional area 4.

Other than in FIGS. 2 and 3, application of a forming method creates not a planar but, instead, a curved functional area 4. This curved functional area 4 is part of the measuring tube wall 2 and serves to accommodate and guide a reflector 3. The curvature of the functional area is such that a sectional view of the functional area 4 describes a circular segment. The functional area 4 is pressed from the inside into the measuring tube wall 2 and protrudes on the perimeter of the measuring tube 1 out from the cylindrical basic form of the measuring tube 1. The forming of the measuring tube can occur especially preferably by an internal high-pressure forming method, also known as hydroforming. In such case, internal pressure deforms the contour of the measuring tube in certain regions. Since the tube interior of the measuring tube receives no flow impeding, sharp edges from this, this technology is especially preferred. Additionally, the production time of a measuring tube in the case of this forming technology is especially small.

Figure 4:
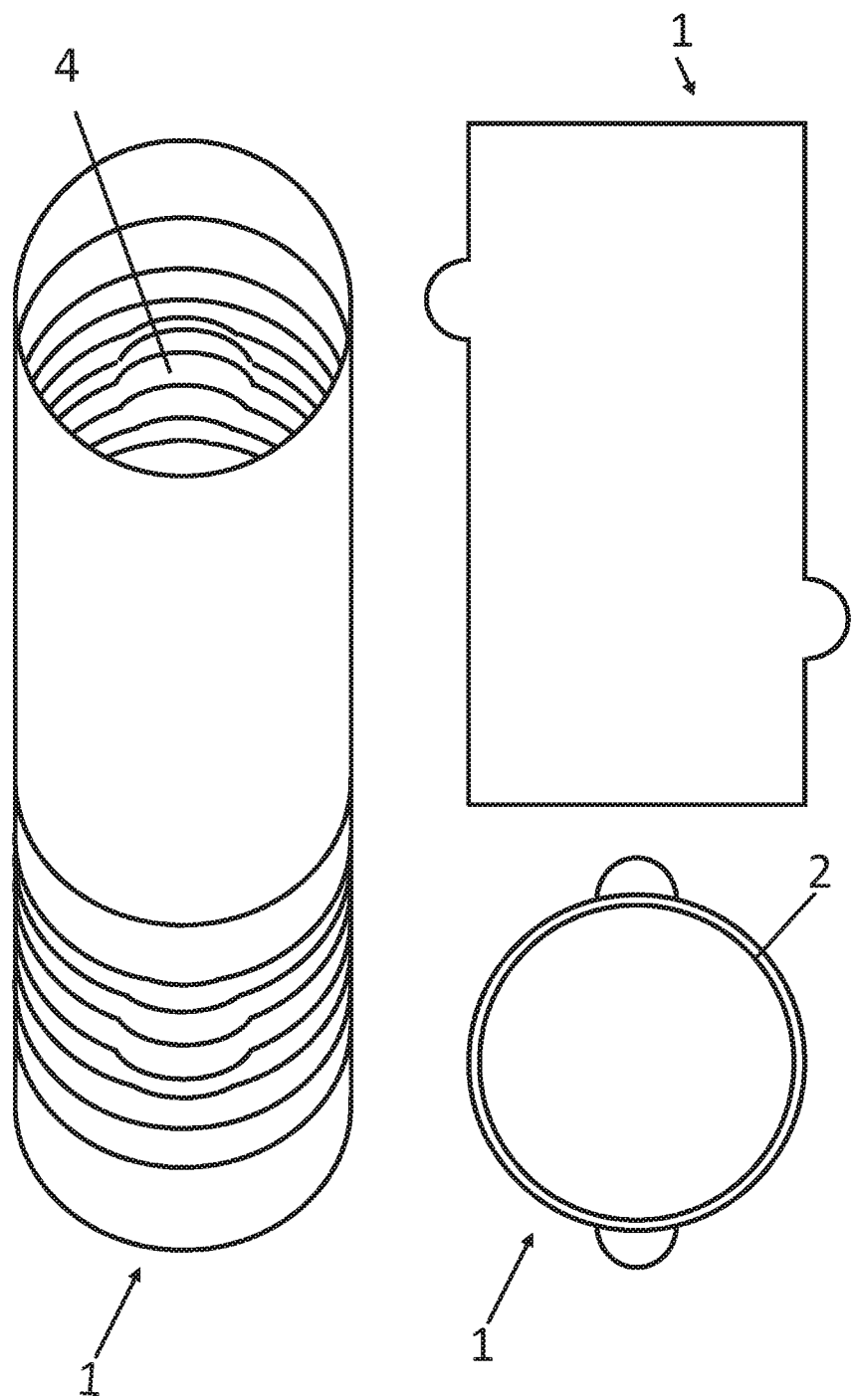
FIG. 4 is a perspective view of the measuring tube of the ultrasonic, flow measuring device

The circular segment can be present in only one sectional view or, especially preferably, and referring to FIG. 4, in all section views through the measuring tube perpendicular to the measuring tube axis. In the first case, it is in the case of three-dimensional extent especially a cylindrical surface portion, thus a subsection of a cylindrical surface or an ellipsoidal surface portion, thus a subsection of an ellipsoidal surface, and in the latter case a spherical surface portion, thus a subsection of a spherical surface.

The curved functional area serves in first line for guiding and orientation of the reflectors 3 in the measuring tube. In such case, a corresponding reflector 3 has a body with a cylindrical surface portion, ellipsoidal surface portion or a spherical surface portion. This body can, e.g. such as shown in FIG. 1, be directly connected with a reflection surface 5 or a special body can be provided, which is connected with the cylindrical surface portion. The cylindrical surface portion, ellipsoidal surface portion or spherical surface portion associated with the reflector lies preferably form fittingly against the cylindrical surface portion, ellipsoidal surface portion or spherical surface portion of the functional area of the measuring tube wall.

It is, however, also possible in a less preferred embodiment that either the reflector or the functional area has webs and/or protrusions, whose distal ends end in at least one sectional view all on the same circular segment.

The reflector can then be oriented for achieving the optimal sound path in the interior of the measuring tube and subsequently fixed to the measuring tube wall. This securing can be done with various technologies, thus e.g. adhesion, brazing or soldering. Especially ideal, however, is a welding of the reflector to the measuring tube, especially in the region of the circular segment.

Securement can also occur with the aid of a foil-like, intermediate layer. This securement technology is known as "reactive bonding" and is, among others, described by M. Wiemer, J. Braeuer, D. Wuensch and T. Gessner in the publication "Reactive Bonding and Low Temperature Bonding of Heterogeneous Materials". *ECS Transactions* 33 (4), pp. 307-318. Especially preferably, the intermediate layer can also be a metal foil, which enables a material bond between reflector and measuring tube wall with a redox reaction. A possible redox reaction, in such case, is the thermite reaction. The special advantage is that the activation energy for a material bond in the case of a reactive bonding material is comparatively small, so that e.g. low thermal energy, voltage, mechanical energy or light energy suffices to start the reaction.

Summarizing, an especially preferred embodiment for manufacture of a measuring tube of the above-described type includes steps as follows:
  1. Deforming a measuring tube by a forming method, especially by a high-pressure forming method, with introduction of a plurality of functional areas, wherein each functional area describes and defines in at least one sectional view a circular segment as a defined position for a reflector;
2. positioning reflectors on the functional areas, wherein the reflector has an area complementary to the functional area, wherein the positioning occurs preferably in such a manner that the reflector is form fitting with the measuring tube wall,
3. orienting the reflectors in order to set a predefined ultrasonic signal path, and
4. securing the reflectors, e.g. by welding.

The positioning and orienting of the reflectors can preferably occur via aids and tools and the angle can be pre-set.

An affixing can then occur, for example, by an electrical current pulse.

A special advantage of this type of mounting is, besides the fine orientation of the reflectors, that the measuring tube requires no opening at the position of the reflectors for affixing and, thus, the measuring tube remains a closed unit.

The invention claimed is:

1. A measuring tube for an ultrasonic, flow measuring device, having:
   a measuring tube wall; and
   at least in certain regions a basic form with rotational symmetry or a polygonal cross section and a straight measuring tube axis, wherein:
   the measuring tube includes at least one functional area for positioning a reflector, on which an acoustic signal on a signal path is reflected;
   said functional area is formed integrally from said measuring tube wall;
   said functional area is formed as a surface area of a spherical cap, which serves as support for said reflector;
   said at least one functional area being oriented in such a manner that a measuring tube section protrudes with a functional area outwardly at least from the basic form of the measuring tube.

2. The measuring tube as claimed in claim 1, wherein: the measuring tube has in the region of said functional area a closed measuring tube wall.

3. The measuring tube as claimed in claim 1, wherein: the measuring tube includes a plurality of functional areas for positioning respective reflectors; and the ultrasonic signal is reflected multiple times on the signal path.

4. The measuring tube as claimed in claim 1, wherein: the measuring tube in a transitional region between the basic form of said measuring tube wall and said functional areas has a metal grain structure, which has an orientation in the direction of the contour of the measuring tube.

5. The measuring tube as claimed in claim 1, wherein: said measuring tube wall is composed of sheet metal.

6. The measuring tube as claimed in claim 1, wherein: said at least one functional area is formed from the measuring tube by an internal high-pressure forming method.

7. An ultrasonic, flow measuring device, comprising:
   a measuring tube;
   a sender for sending an acoustic signal on a signal path; and
   a receiver for receiving the acoustic signal on the signal path, wherein:
   said measuring tube includes at least one reflector having at least one reflection surface; and
   said reflector includes a connection surface, which in at least one sectional view defines a circular segment or wherein said reflector includes a connection surface, from which stops protrude, which in at least one sectional view define a circular segment, which circular segment is embodied complementarily to the circular segment of at least one functional area of said measuring tube; and
   said reflector is arranged on said functional area of said measuring tube;
   said functional area is formed integrally from said measuring tube wall;
   said functional area is formed as a surface of a spherical cap, which serves as support for said; and
   said at least one functional area is oriented in such a manner that a measuring tube section protrudes with a functional area outwardly at least from the basic form of the measuring tube.

8. The ultrasonic, flow measuring device as claimed in claim 7, wherein:
   the measuring tube has a plurality of reflectors, wherein the acoustic signal is reflected on the signal path multiple times, wherein the acoustic signal is reflected at least once on the reflection surface of each reflector.

9. The ultrasonic, flow measuring device, as claimed in claim 7, wherein:
   the signal path is composed of straight subsections;
   a) the minimum distances of at least three subsections have a separation of 0.4-0.6 r from the measuring tube axis, wherein r is the inner radius of the measuring tube;
   b) a first subsection, which defines a first axially parallel plane, has a directly corresponding second subsection, which defines a second axially parallel plane, the two planes extend through a reflection surface of a first reflector and the normal vectors enclose an angle of less than 10°; and
   c) a third subsection, which defines a third axially parallel plane, has a directly corresponding fourth subsection, which defines a fourth axially parallel plane, the two planes extend through a second reflector having a reflection surface and the normal vectors enclose an angle of less than 10°.

10. The ultrasonic, flow measuring device as claimed in claim 7, wherein:
    the ultrasonic, flow measuring device takes into consideration a rotation balancing of rotating flows.

11. The measuring tube as claimed in claim 1, wherein: said measuring tube wall is composed of sheet metal with a sheet metal thickness of 1-5 mm.

* * * * *